UNITED STATES PATENT OFFICE.

EDWARD C. EKSTRÖMER, OF BOSTON, AND MELCHER EKSTRÖMER, OF QUINCY, MASSACHUSETTS.

PROCESS OF TREATING ALBUMINOIDS.

No. 926,056.　　　　Specification of Letters Patent.　　　　Patented June 22, 1909.

Original application filed May 13, 1907, Serial No. 373,444. Divided and this application filed July 22, 1907.
Serial No. 384,842.

*To all whom it may concern:*

Be it known that we, EDWARD C. EKSTRÖMER and MELCHER EKSTRÖMER, subjects of the King of England and the King of Sweden, respectively, and residents, respectively, of Boston, in the county of Suffolk, and of Quincy, in the county of Norfolk, State of Massachusetts, have invented a new and useful Improvements in Processes of Treating Albuminoids, of which the following is a specification.

Our invention relates to a process of treating an albuminoid for the purpose of producing a substance which may be employed to form part of the active material of a secondary battery element, whereby many of the defects found in existing batteries of this class may be overcome, although said substance is not limited to such use.

The active material of a secondary battery element as ordinarily constructed consists in general of a metallic oxid formed into a paste in any suitable manner. Such active material when in use exhibits certain working defects such as buckling, sulfating, etc.

Attempts have heretofore been made to overcome these defects by producing minute interstices or cavities in the active material itself, to the end of thereby obtaining greater freedom in the passing off of gas when the battery is in operation. According to our experience however it has been found that such a construction has for various reasons failed to accomplish the purpose intended.

Our improvement consists in the process of treating an albuminoid, preferably gelatin, whereby a portion of the elements nitrogen and hydrogen is removed without changing the consistency and physical appearance of the albuminoid and leaving the same porous, elastic and permissive of osmosis or dialysis, in other words, converting said albuminoid into a dialyzer of high dialytic power.

An albuminoid which has been so treated may be used for improving the active element of a secondary battery by mixing the same with the active material thereof.

We have found that when the substance described is introduced into the active element of a secondary battery, the defects now existing in the ordinary secondary battery plate are largely, if not entirely, removed, the tendency to buckling overcome, sulfating diminished, and the efficient life of the device materially prolonged.

We will now proceed to describe what we believe to be the best method of treating the albuminoid and also of the subsequent handling of the resultant product in the production of the improved secondary battery plate above mentioned.

While we believe that the results above described may be obtained by the treatment of albuminoid substances generally, yet we will take for the specific purpose of the present description that form of albuminoid commonly known as gelatin, which according to our preferred form of procedure we treat as follows: The gelatin is formed into a paste and then formed into a filament of relatively minute cross-section. We do not, however, desire to limit ourselves to this specific method of procedure, for the gelatin may be formed in any suitable manner into any suitable shape, provided the resultant mass be sufficiently thin. The mass is then treated with dilute sulfuric acid sufficiently long to permit of thorough percolation of the acid through the same. This may be done by soaking the filaments of gelatin in sulfuric acid having a specific gravity of about 1,001 for about ten hours. The mass thus impregnated with the sulfuric acid solution is then treated for the removal of a portion of the elements hydrogen and nitrogen, as thoroughly as practicable. We have found that a convenient and efficient means of bringing about this removal is by treating the mass with heat and water under pressure, preferably after removing the superficial acid by rinsing the same in clean water. This may be done by placing the mass with water in a hermetically closed vessel so constructed that its contents may be raised to a high degree of heat, considerably above the boiling point of the water employed and heating the same at a temperature of about 250 degrees Fahr. for about half an hour. When the contents of the vessel, after such treatment, are examined, the water will be found to contain ammonium sulfate while a portion of the elements hydrogen and nitrogen will be found to have been removed from the albuminoid, the consistency and physical appearance of which, however, have not been changed and which is now porous, elastic, and highly permissive of dialysis.

When the ordinary gelatin of commerce has been treated in the manner above set forth it will be found that about 80 per cent. of hydrogen and about 10 per cent. of nitrogen have been removed therefrom.

In order to conveniently unite the albuminoid so treated with the active material which may be selected for the formation of a secondary battery plate, the albuminoid may be comminuted and mechanically mixed with the active material of the plate prior to its formation.

The albuminoid treated as above set forth and mixed with the active material of the battery element will furnish elasticity and porosity and, being a dialyzer, will permit dialysis, so that the electrolyte will have free access to the interior of the plate during charging and sulfating will be prevented Further, the plate when formed will be elastic throughout and will be found to permit uniform self-contraction and self-expansion and the free release of gas during heavy charging and discharging.

While we prefer to use gelatin as above stated we have been able to obtain good results by substituting therefor fish glue or isinglass, or feathers or hair digested with acid and treated as above set forth, as well as other albuminoid substances.

The suitable ratio of the active substance of the plate to the albuminoid substance will depend upon the output or rate of discharge of the battery and therefore may be best determined empirically or experimentally to suit the conditions of any particular case.

This application is a division of our application Serial No. 373,444, filed May 13, 1907.

We claim:

1. The process herein described which consists in treating an albuminoid with sulfuric acid, removing the superficial acid therefrom and then treating said albuminoid with water under heat and pressure, until a portion of the elements nitrogen and hydrogen is removed without changing the consistency and physical appearance of said albuminoid and until the latter is rendered elastic, porous and highly permissive of dialysis.

2. The process herein described which consists in treating gelatin with sulfuric acid, removing the superficial acid therefrom and then treating said gelatin with water under heat and pressure, until a portion of the elements nitrogen and hydrogen is removed without changing the consistency and physical appearance of said gelatin and until the latter is rendered elastic, porous and highly permissive of dialysis.

3. The process herein described which consists in treating an albuminoid with acid and then treating said albuminoid with water under heat and pressure, until a portion of the elements nitrogen and hydrogen is removed without changing the consistency and physical appearance of said albuminoid and until the latter is rendered elastic, porous and highly permissive of dialysis.

4. The process herein described which consists in treating gelatin with acid and then treating said gelatin with water under heat and pressure, until a portion of the elements nitrogen and hydrogen is removed without changing the consistency and physical appearance of said gelatin and until the latter is rendered elastic, porous and highly permissive of dialysis.

In testimony whereof, we have hereunto subscribed our names this 20th day of July 1907.

EDWARD C. EKSTRÖMER.
MELCHER EKSTRÖMER.

Witnesses:
  GEO. K. WOODWORTH,
  E. B. TOMLINSON.